United States Patent Office 3,399,063
Patented Aug. 27, 1968

3,399,063
INJECTION INTO POULTRY MEAT OF PHOSPHATES IN NON-AQUEOUS SUSPENSION
Donald V. Schwall, Glen Ellyn, and Alan B. Rogers, Palos Park, Ill., and Dennis Corbin, Evansville, Ind., assignors to Armour and Company, Chicago, Ill., a corporation of Delaware
No Drawing. Continuation-in-part of application Ser. No. 492,319, Oct. 1, 1965. This application Nov. 17, 1967, Ser. No. 683,794
6 Claims. (Cl. 99—107)

ABSTRACT OF THE DISCLOSURE

In the treatment of raw poultry for cooking, a water-soluble sodium or potassium polyphosphate salt is suspended in a non-aqueous vehicle, such as edible fat, and the mixture introduced into muscular portions of the poultry whereby subsequently during contact with the natural juices of the poultry, the salt migrates away from the fat and into the natural juices and into the muscular portions of the poultry.

Related application

This application is a continuation-in-part of our copending application Ser. No. 492,319, filed Oct. 1, 1965, now abandoned.

Brief summary

This invention relates to injection into poultry meat of phosphates in non-aqueous suspension, and more particularly to the process for treating poultry to render the meat more tender, juicy, and flavorful, and to products of the process. By "poultry" is meant turkeys, chickens, ducks, geese, and the like.

Present methods for preparing poultry, especially turkeys, often produce a product which on cooking lacks juiciness, tenderness, and flavor. Several sodium phosphates have been found useful in retaining natural juices and these have been employed with water in which the phosphates are soluble. Unfortunately, the injection of water containing the phosphates into poultry dilutes the natural juices of the meat, and such dilution is unsatisfactory. The added water not only dilutes the juices and flavor, but is objectionable to inspection agencies and some consumers because the consumer pays meat prices for water. If it were possible to introduce the phosphates in a vehicle which would not dilute the juices so that the natural juices would be retained in the cooked bird, a substantial advance would be made in this art.

We have discovered that by employing a non-aqueous vehicle, such as an edible liquid fat, and by agitating the fat in admixture with the non-soluble, finely-powdered phosphate, a temporary suspension can be obtained which when injected into the poultry brings about a rapid migration of the phosphate into the natural juices of the poultry, while at the same time the fat remains relatively fixed at the point of injection. The fat then may exude during the cooking stage to provide self-basting for the poultry throughout the cooking stage.

A primary object, therefore, is to provide a method for treating raw poultry which after cooking is tender, juicy, and flavorful. A further object is to provide a method for treating poultry and poultry parts in which phosphates are suspended within an edible fat and the mixture injected into the meat. Other specific objects and advantages will appear as the specification proceeds.

Detailed description

In one embodiment of our invention, a polyphosphate powder is introduced into an edible fat and agitated to bring about a suspension of the phosphate within the fat. The fat is then introduced by needles or other injection devices into a muscle portion of the poultry or a poultry part.

The fat may be any edible fat, such as, for example, butter, margarine, corn oil, lard, cottonseed oil, and other well known vegetable and animal fats. All of such fats have a specific gravity which is substantially less than that of the polyphosphate salts, and, as a result, the salts tend to settle rapidly in the fats. It is this incompatibility, as far as solution and suspension are concerned, which brings about the rapid migration of the phosphates after the fat carrier is injected into the intact muscular portion of the poultry, and thus the phosphates are effective with the natural juices and do not carry a diluting material into the juices.

As phosphates, we may use any non-cyclic, polyphosphoric acid salt of sodium or potassium, having a ratio of $H_2O$ to $P_2O_5$ of about 0.9 to 1 to about 2.0 to 1. The preferred polyphosphate is sodium tripolyphosphate. Other preferred phosphates are sodium hexametaphosphate, tetrasodium pyrophosphate, tetrapotassium pyrophosphate, and potassium tripolyphosphate. All of the foregoing salts have a specific gravity higher than the edible fats and tend to settle to the bottom of the vessel when mixed with the edible fats at temperatures at which a major portion of the fat is liquid. Hence, in order to provide a temporary suspension of the salts in the fats, substantial agitation is needed.

The amount of phosphates is not critical, but we prefer to employ phosphates, based on the carcass weight, in the range of .01 to 10.0 percent. Best results have been obtained employing a range of .25 to 4.5 percent. The fat may also be used in a wide range, it being sufficient that the fat serving as a carrier be able to physically contain and carry the phosphate into the poultry meat. Ordinarily, the range will be from 0.1 to 10 percent based on the carcass weight, the preferred amount being about 2 to 4 percent.

The fat and phosphate mixture may be injected into the dark meat as well as the breasts, but we find that the greatest advantage is in the injection of the mixture into the breast portions of the poultry.

We have found that gases, such as air, nitrogen, $CO_2$, etc., can be incorporated into the fat medium to produce a viscous consistency that will suspend the phosphate and yet allow the material to be pumped and injected through needles into the poultry meat. To bring about air entrapment, we prefer to raise the temperature of the fat and to heat the fat at the high temperature for the introduction of air bubbles into the fat. For example, bakers' margarine will entrap air and provide a desired consistency to suspend the phosphate at a temperature of approximately 100° F., whereas table margarine and butter perform best around 80° F. When the mixture is injected through needles which stretch the muscle meat, and the needles are then withdrawn, the pressure exerted on the material breaks the bubbles and the phosphate migrates rapidly, as in the case where no air is introduced.

Since the fat material, such as butter or margarine, remains in discrete bodies within the muscle portion of the filtrate after the migration of the phosphates, the fat material is useful in carrying distinctive flavors, such as butter flavor, enhanced butter flavor, oil-soluble flavors, etc. By way of example, the flavor of butter may be enhanced by incubating cream containing butter fat with an enzyme, such as the enzyme obtained from the gullet of a calf, which produces free fatty acids consisting predominantly of butyric acid and which gives the butter an enhanced butter flavor. Similarly, margarine oils may be blended with lipolyzed cream of this character to give the margarine a natural butter flavor. By incubating cream containing butter fat with a lipase enzyme for producing short chain free fatty acids until a titratable acidity of about 0.70–1.20 calculated as lactic acid is obtained and mixing the cream after incubation of the lipase with the margarine emulsion, the margarine can be given a greater than single strength butter flavor. It is found that the building up of the short free fatty acid fraction of the margarine or butter by the action of lipase does not prevent the rapid migration of the phosphates from such a carrier material, and such fats may be used where the added butter flvaor is desired.

The process may be used to inject the phosphate and fat material into raw poultry carcasses after the poultry has been eviscerated and when the carcass is still warm, or it might be injected after the carcass is chilled and before freezing. Further, such injection may be made into poultry parts instead of into the entire carcass.

Specific examples illustrative of the process may be set out as follows:

EXAMPLE I

Eight-pound turkeys which had been frozen and thawed to an average carcass temperature of 50° F. were injected with 40 cc. of the following materials per side of turkey breast:

(a) Butter containing 10% powdered tripolyphosphate
(b) Water solution of 10% tripolyphosphate
(c) Butter alone
(d) Control—no injection.

When the turkeys were roasted, they were evaluated for flavor, tenderness, and juiciness. The turkey injected with butter and phosphate was rated best of all the samples tested.

EXAMPLE II

A test was conducted to study the migration of a non-aqueous material butter (when it is injected into turkey breast meat). Oil-soluble dye (red O) was used to follow the oil phase, and FD & C blue No. 1—aluminum lake was used to simulate the migration of a material such as tripolyphosphate. 60 cc. of "red" butter was injected into one side of a turkey and 60 cc. of "blue" butter into the other side. The injected turkey was held overnight in a refrigerator and roasted the following day to an internal temperature of 185° F. and observed. The red oil-soluble dye stayed suspended in the butter and was not transferred to the meat. The dye migrated with the butter. The blue water-soluble dye was deposited in the meat, indicating that a material that was not soluble in the oil could be transferred to the meat tissue.

EXAMPLE III

A comparison was made between margarine and butter, both containing 10% phosphate when injected into turkeys. Two turkeys which had been frozen and thawed to an internal temperature of approximately 70° F. were injected with 30 cc. of either butter or regular table margarine, both of which contained 10% powdered sodium tripolyphosphate. After the birds were injected, they were frozen and then roasted from the frozen state by the "country bake" method, which is basically a method using a 400° F. oven and roasting until the turkeys attain an internal temperature of approximately 185° F. Both the margarine and butter, including phosphate, made the roasted turkey meat juicier and noticeably more tender. The butter flavor was preferred over the regular margarine flavor.

EXAMPLE IV

A comparison of butter plus phosphate and high flavor margarine plus sodium tripolyphosphate was made. The following materials were injected at a rate of approximately 30 cc. per side of breast on turkeys which were approximately 40° F. and averaged 9 pounds each:

(a) Control—no injection
(b) 90% butter plus 10% phosphate
(c) 20% high flavor margarine plus 70% regular margarine plus 10% phospshate
(d) 45% high flavor margarine plus 45% regular margarine plus 10% phosphate The butter and margarine materials were heated to approximately 100° F. and mixed with the phosphate at that temperature. This mixture was then constantly agitated to keep the phosphate in suspension. The warm mixture was injected into the turkeys with a ham pickle pump using needles with an outer diameter of approximately 3/16 of an inch. Each needle contained 8 holes, ½" apart, which were .050" in diameter. The turkeys were injected with between 33 and 45 cc. of material. After injection, the turkeys were frozen after being wrapped in aluminum foil. The turkeys were roasted from a frozen state in a 400° F. oven for 3½ hours. Then the aluminum foil was removed and roasting was continued until the internal thigh temperature reached 180° F. After roasting, the turkeys were evaluated, and the turkeys containing high flavor margarine were judged to be equal to or better than the butter-treated turkeys by a panel of tasters, and all of the injected turkeys were preferred as being juicier and more tender and more flavorful than the control.

EXAMPLE V

Two turkeys weighing approximately 9 pounds were injected on one side of the breast with 30 cc. of margarine containing 5% tripolyphosphate and on the other side with 30 cc. of margarine containing 10% tripolyphosphate. The roasted turkey breast meat was compared for tenderness, using a Lee-Kramer shear press. The average pounds of force needed to shear 5 successive 3 mm. thick slices of breast meat are shown in the table below:

| Treatment: | Average lbs. of force |
| --- | --- |
| Control | -------- |
| Margarine plus 5% sodium tripolyphosphate | 3% less |
| Margarine plus 10% sodium tripolyphosphate | 11% less |

EXAMPLE VI

Turkeys weighing approximately 10 pounds and held at a carcass temperature of approximately 50° F. were injected with 30 cc. of margarine on one side of the breast and this was compared with the other side which acted as a control. These turkeys were compared to similar turkeys which were injected with margarine containing 10% powdered sodium tripolyphosphate which were compared to non-injected breasts on the same bird. When the turkeys were roasted and evaluated for tenderness, the turkey breast which was injected with margarine alone required 1.6% less average pounds of force to shear the meat, and the margarine containing 10% phosphate required 15% less average pounds of force to shear the roasted turkey meat. This indicated the extreme value of phosphate being dispersed in the muscle by the margarine.

EXAMPLE VII

When phosphate is added to melted fats or margarine, it tends to settle to the bottom of the container. A method was developed to minimize this settling of phosphate by holding the fat or margarine material at a temperature at which air could be incorporated into the fat or margarine, making a more plastic material. For example, bakers' margarine was heated to a temperature of 100° F. and mixed vigorously with an electric stirrer. The stirring action incorporated some small air bubbles into the mixture. When powdered sodium tripolyphosphate was added to the mixture, it remained suspended, and when it was pumped into turkey with a pickle-type injection pump, an even distribution of phosphate was implanted in the turkeys. Turkeys injected by this method were comparable to those injected with margarine which had not incorporated air.

EXAMPLE VIII

Twelve turkeys ranging in size from 6 to 12 pounds were injected with four types of non-aqueous materials containing 10% sodium tripolyphosphate. The materials used were table margarine, vegetable oil (cottonseed oil), butter, and bakers' margarine. Besides the 10% phosphate, the materials were combined with 25% Flavor-Up margarine. The injected turkeys in this case, just one-half of the breast of each, were compared to each other and to their common control. In this test, there was a definite preference for all of the injected turkeys, which illustrated that all four types of non-aqueous materials were satisfactory for carrying the phosphate into the turkey and improving the roasted turkey flavor, moistness, and tenderness. When the same turkeys were held refrigerated for 24 to 72 hours at 35° C. and evaluated, the improvement in flavor and texture over the control was more pronounced than when the turkeys were first roasted.

EXAMPLE IX

The process may be carried out as described in Example III using instead of tripolyphosphate, sodium hexametaphosphate, with comparable results.

EXAMPLE X

In the case where the injection of fat and phosphate mixture is made while the carcass is still warm (prior to chilling), the operator injects the desired amount of the mixture into the breast of the bird, such as a turkey, as it moves along the conveyor line.

EXAMPLE XI

After a turkey is chilled and is hung on a drip line prior to packaging in Cryovac bags, the turkey is washed to remove excess material that might accumulate on the surface of the turkey, and the fat and phosphate mixture is injected at this stage. A vegetable oil, such as corn oil or cottonseed oil, is advantageously injected when the carcass is cold, whereas a higher melting-point fat may be used when it is injected into a carcass having a higher temperature.

EXAMPLE XII

Fresh turkeys, slaughtered, picked and eviscerated in conventional manner, chilled in continuous chiller to an average carcass temperature of 50° F. were injected into one-half of the breast with either 30 to 40 cc.'s of Hi-Flavor table margarine containing 9% sodium tripolyphosphate powder or the same margarine containing 9% tetra sodium phosphate. After the injection process, the turkeys were placed in a blast freezer (−40° F.) and frozen. Two turkeys of each treatment were roasted from the frozen state at 400° F. and evaluated for flavor, color, juiciness and tenderness. The tripolyphosphate-injected turkeys were slightly preferred over the tetra phosphate-injected breast. Both phosphate-injected treatments were preferred over the untreated controls.

EXAMPLE XIII

Eight large tom turkeys, one-half of which were injected in the breast, drumstick and thigh, either on one side or both with an 80° F. mixture of whipped Hi-Flavor table margarine containing 10% powdered sodium tripolyphosphate, were processed, chilled and aged in the accepted manner and injected with a dual mechanical injection needle operating at approximately 50 p.s.i. After injection the carcasses were sprayed with either warm or cold water to remove any excess margarine, phosphate mixture on the carcass surface, then packaged and frozen.

EXAMPLE XIV

Eight hen turkeys which had been chilled (40° F.) and aged in slush ice (16 hours) were injected during the normal packaging operation. The injection was done on the carcasses after draining and prior to packaging. Margarine containing 10% tripolyphosphate heated to 80° F. was hand-injected with a dual needle at a level of 2 to 4% of the carcass weight. Excess injection material rapidly set up on the carcass surface and was then wiped off, producing a desirable appearing carcass when packaged.

EXAMPLE XV

Four young hen turkeys which had been eviscerated, but not chilled (breast temperature was 100° F.) were injected with 10% tripolyphosphate-margarine mixture with a mechanical pump and dual needles. The injected carcasses were then completely chilled and aged in slush ice, packaged and blast frozen. The carcasses were cut up and the injected poultry parts tested as in Example I, with comparable results.

EXAMPLE XVI

Four Beltsville type (small) turkeys which were chilled in a continuous chiller to 50° F. were injected with 10% tripolyphosphate, chilled in slush ice and frozen. Injection was done with needles operating from a recirculating pump at a pressure of 35–45 p.s.i.

EXAMPLE XVII

Eight turkeys stuffed in the conventional manner were injected with margarine containing 10% tripolyphosphate prior to packaging and freezing. The roasted turkeys had improved stuffing flavor besides improved meat acceptability. Comparable results were obtained with chickens, including hens, capons, frying chickens, and with geese, and with injected portions thereof.

In all of the operations where the turkeys or other poultry are injected, the excess injection material is removed by wiping or washing the injection area, and a clean, attractive carcass surface results except for the few slight skin perforations which were made by the injection needles.

In the injection of turkeys and other poultry, the holes were preferably made close to the keel (breast) bone so that the turkeys, etc. were self-basting during the roasting operation. Thus the injection procedure not only improves the interior turkey meat but also improves the surface appearance and texture while the turkey is roasting.

While in the foregoing specification we have set forth certain procedure in considerable detail for the purpose of illustrating embodiments of the invention, it will be understood that such details may be varied widely by those skilled in the art without departing from the spirit of our invention.

We claim:

1. In a process for treating raw poultry containing natural juices in the muscular portions thereof to prepare said poultry for cooking, the steps of agitating a mixture of a non-cyclic polyphosphate acid salt of an alkali metal selected from the group consisting of sodium and potassium and a liquid edible fat to suspend said salt in said fat, said salt having a tendency under quiescent conditions to settle out in said liquid fat, and injecting said mixture into said muscular portions of said poultry while said salt is still suspended in said fat whereby subsequently during contact with said natural juices by said fat and salt mixture there is migration of said salt away from said fat and into said natural juices and into said poultry muscular portions.

2. The process of claim 1 in which said salt is sodium tripolyphosphate.

3. The process of claim 1 in which said fat is butter.

4. The process of claim 1 in which said fat is margarine.

5. In a process for treating a raw poultry carcass containing natural juices to prepare the carcass for cooking, the steps of agitating a mixture of sodium tripolyphosphate and a liquid edible fat to suspend the phosphate in said fat, and injecting the mixture while said phosphate is still suspended within said fat into the breast muscle portion of the carcass whereby subsequently under contact by said fat and phosphate mixture with said natural juices there is a migration of phosphate away from said fat and into said natural juices and into the breast portion of said carcass.

6. The process of claim 1 in which gas is incorporated in said fat.

References Cited
UNITED STATES PATENTS

| | | |
|---|---|---|
| 2,464,928 | 3/1949 | Hall. |
| 2,629,664 | 2/1953 | Watts et al. 99—157 X |
| 2,767,096 | 10/1956 | Schotte 99—107 |
| 2,768,084 | 10/1956 | Griffith et al. 99—157 X |
| 3,035,508 | 5/1962 | Nelson. |
| 3,104,170 | 9/1963 | Mahon 99—159 X |
| 3,215,534 | 11/1965 | Baum et al. 99—159 X |
| 3,216,826 | 11/1965 | Wattenbarger. |

HYMAN LORD, *Primary Examiner.*